Oct. 2, 1928.

M. L. FYKSE 1,686,372

STEERING MECHANISM

Filed May 31, 1922

INVENTOR.
MITCHELL L. FYKSE
BY Ralph W. Brown.
ATTORNEY.

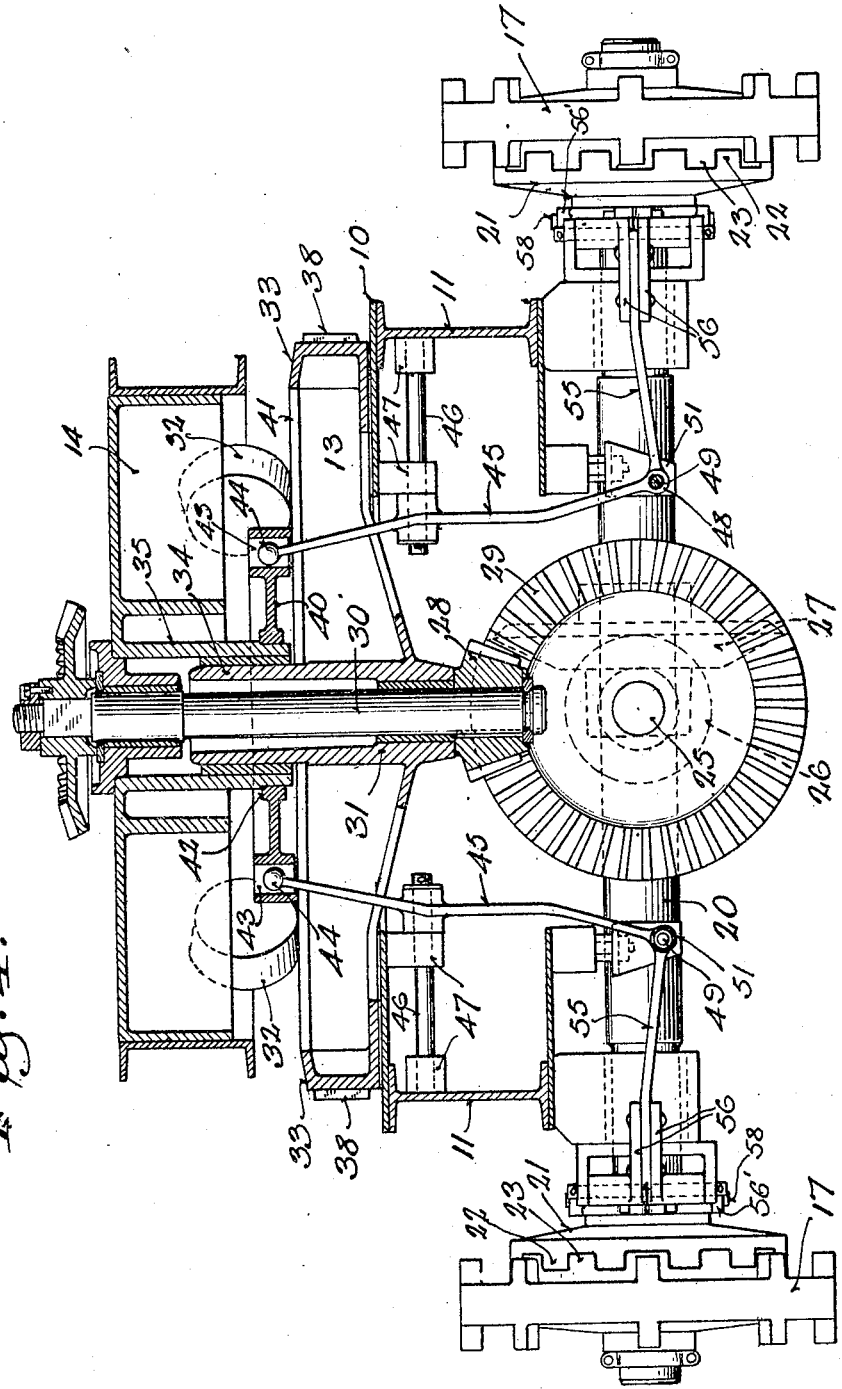

Patented Oct. 2, 1928.

1,686,372

UNITED STATES PATENT OFFICE.

MITCHELL L. FYKSE, OF MILWAUKEE, WISCONSIN, ASSIGNOR, BY MESNE ASSIGNMENTS, TO BUCYRUS-ERIE COMPANY, OF SOUTH MILWAUKEE, WISCONSIN, A CORPORATION OF DELAWARE.

STEERING MECHANISM.

Application filed May 31, 1922. Serial No. 565,002.

This invention has to do with heavy portable machines, such as power excavators, cranes and the like, in which the operating parts are carried by a head frame mounted upon a base frame for horizontal rotation with respect thereto. In machines of this type, the base frame is not infrequently equipped with appropriate creeping traction units by which the machine may be moved from place to place under its own power.

One object of the present invention is the provision of mechanism by which the distribution of power to the traction units may be placed under the control of the head frame so that rotation of the head frame may be utilized for steering purposes.

Another object is the provision of mechanism for controlling the distribution of power to the traction units for steering purposes and adapted to be releasably placed under the control of the rotatable head frame in any angular position thereof relative to the base frame.

Another object is to improve the construction and operation of steering mechanisms in machines of this type.

Other objects and advantages will hereinafter appear.

One embodiment of this invention is illustrated in the accompanying drawings, in which:

Figure 4 is a sectional view taken substantially along the line 4—4 of Figure 1.

Figure 1:
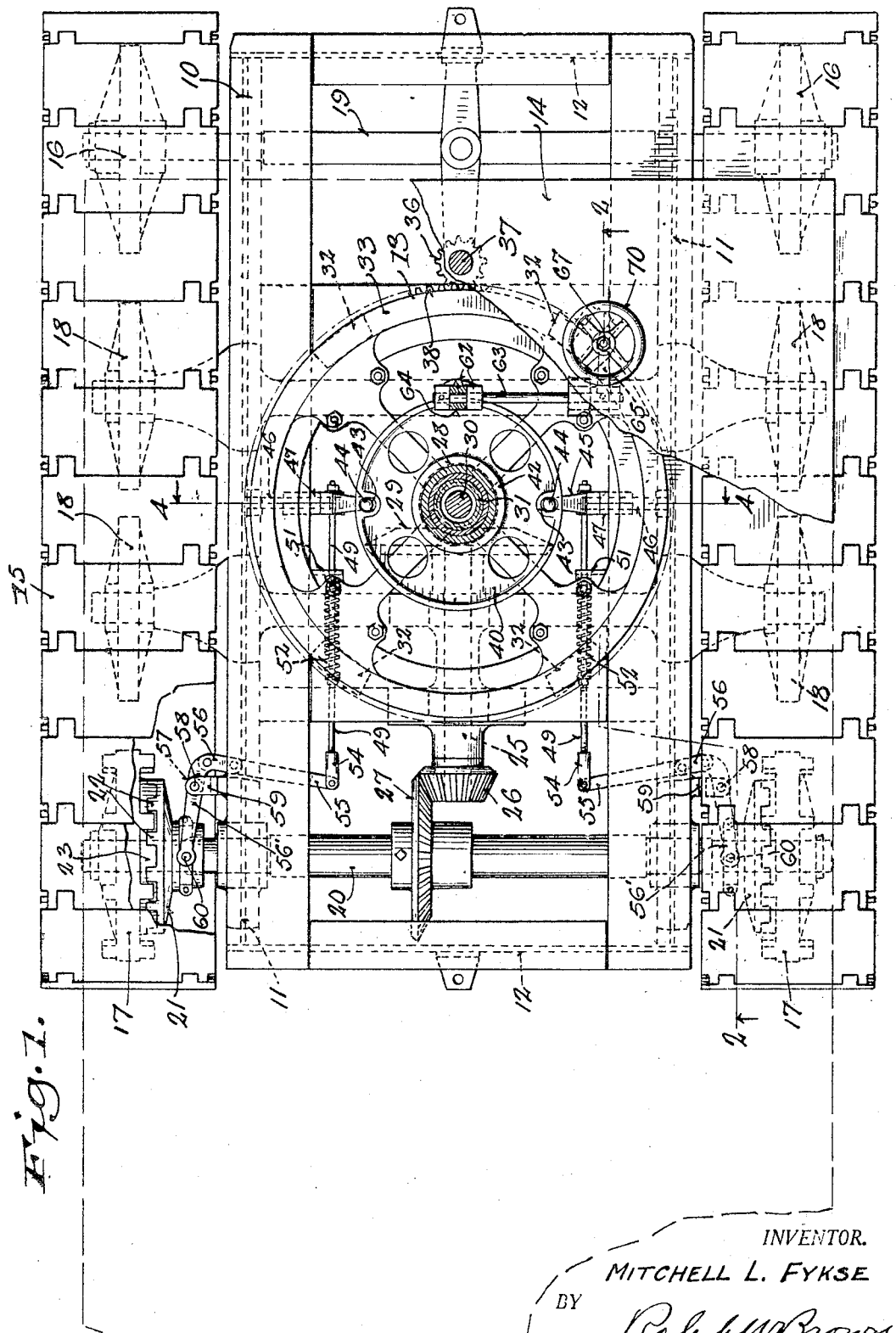
Figure 1 is a fragmentary plan view of a power excavator equipped with a steering mechanism constructed in accordance with the present invention.

The machine selected for illustration comprises a rigid base frame 10 of a construction substantially identical with that described in the copending application of S. R. W. M. Bager, filed February 7, 1921, Serial No. 443,106. It will suffice here to say that this frame includes a pair of longitudinal side sills 11, connected by transverse bars 12, and braced by an annular rack and track member 13 constituting a turn-table support for the revoluble head frame 14 hereinafter referred to.

The base frame 10 is mounted upon a pair of creeping traction units in the form of endless tread belts 15, such as described in the copending application of S. R. W. M. Bager and Werner Lehman, Serial No. 443,164, filed February 7, 1921. These tread belts are trained over and around the front and rear wheels 16 and 17 of the base frame and arranged to form endless tracks for the additional intermediate frame supporting wheels 18.

The front wheels 16 are journaled upon the ends of the front axle 19 adjustably fixed to the side sills 11 of the base frame. The rear wheels 17 constitute driving tumblers for the tread belts. They are journaled upon the ends of the rear axle 20 and are selectively driven therefrom through appropriate clutch mechanisms, which in this instance constitute two clutch elements 21 splined on the axle shaft 20 and provided with appropriate clutch teeth 22 for interlocking engagement with similar teeth 23 formed upon the adjacent faces of the rear wheels 17. The clutch elements 21 are shiftable upon the axle 20 into and out of engagement with their corresponding wheels 17, their positions being controlled through appropriate clutch collars 24, in a manner to be hereinafter described. The axle shaft 20 is driven from a shaft 25 through bevel gears 26 and 27, shaft 25 receiving its power through gears 28 and 29 from a vertical shaft 30 journaled in the concentric hub portion 31 of the annular member 13.

The head frame 14 is supported in the usual manner upon a series of rollers 32 adapted to travel along the circular track 33 formed upon the upper face of the annular member 13. The upstanding portion 34 of the central hub 31 of the member 13 projects into a circular flange or sleeve 35 depending from the head frame and constitutes a central pivot about which the head frame revolves. Rotation of the head frame is effected and controlled in the usual manner, through a pinion 36 secured to a shaft 37 carried by the head frame and meshing with the rack teeth 38 extending about the periphery of the member 13. Shaft 37, as well as shaft 30, is driven by mechanism (not shown) carried by the head frame.

A further or more detailed description of the parts hereinabove referred to is deemed unnecessary to a complete understanding of the present invention. As above pointed out, the present invention has to do with the provision of mechanism by which rotation of the head frame may be utilized to effect steering of the machine during its travel from place to place. In the machine shown, this is accomplished by the use of a ring 40 associated with the clutch mechanisms hereinabove referred to and adapted to be releasably connected with the head frame for limited rotation therewith.

Ring 40 rests freely upon the spokes 41 of the annular member 13 and is provided with a central portion 42 encircling the depending flange 35 of the head frame by which it is retained concentrically of the member 13. At diametrically opposite points within its periphery, the ring 40 is provided with appropriate sockets 43, each adapted to receive the upper rounded end 44 of a lever 45. Each of the levers 45 is rockably supported upon a stub shaft 46 secured in suitable bearing brackets 47 fixed in the base frame 10. The lower end of each lever 45 is provided with an eye 48 through which a link 49 extends, each link 49 being provided with a nut 50 at one end against which the lower end of the lever is forced when rocked in one direction. Each link is mounted for lengthwise reciprocation in a bracket 51 secured to the base frame 10. A coiled spring 52, interposed between a nut 53 on the link and the bracket 51, tends at all times to shift the link in one direction. The other end 54 of each link 49 is connected to an arm 55 rigidly connected with and between a pair of lever arms 56 carried by a pair of hubs 57 mounted upon a vertical pivot pin 58. Each of the pins 58 is mounted in a fixed bracket 59 secured to the base frame 10 adjacent one of the clutch elements 21. The hubs 57 of each pair are provided with lever arms 56′ respectively extending above and below one of the clutch collars 24 and pivotally connected thereto through trunnions 60.

Arms 56 and 56′ are formed as integral parts of their respective hubs 57. The arrangement is such that when one of the links 49 is shifted longitudinally the corresponding arm 55 and cooperating lever arms 56 and 56′ swing as a unit about their pivot 58 to shift the corresponding clutch element into or out of engagement with its driving tumbler 17.

Provision is made for effecting a releasable mechanical connection between the head frame 14 and the ring 40 through which the ring 40 may be caused to rotate with the head frame through a limited angle. This is accomplished in this instance by the use of a clamp shoe 61 for frictional engagement with the ring 40 at any point along the periphery thereof. Shoe 61 is carried by an arm 62 fixed to a rock shaft 63 journaled in appropriate brackets 64 secured to the head frame 14. Shaft 63 is actuated and controlled through an arm 65 secured thereto and having an eye 66 at one end loosely embracing the end of a vertical control shaft 67. Shaft 67 is threaded through a nut 68 fixed to the upper frame 14 and is provided at its lower end with a pair of thrust collars 69 between which the end of the arm 65 is interposed. Shaft 67 is actuated and controlled by an appropriate hand wheel 70 fixed to the upper end thereof within convenient reach of the operator. Suitable lock nuts 71 are preferably provided for limiting the downward thrust of the shaft.

During normal operation of the machine, the shaft 67 is in an uppermost position so that the shoe 61 is out of contact with the ring 40. The head frame 14 is thus permitted to rotate about its vertical axis in the performance of its digging or hoisting functions without disturbing the position of ring 40.

Figure 2:
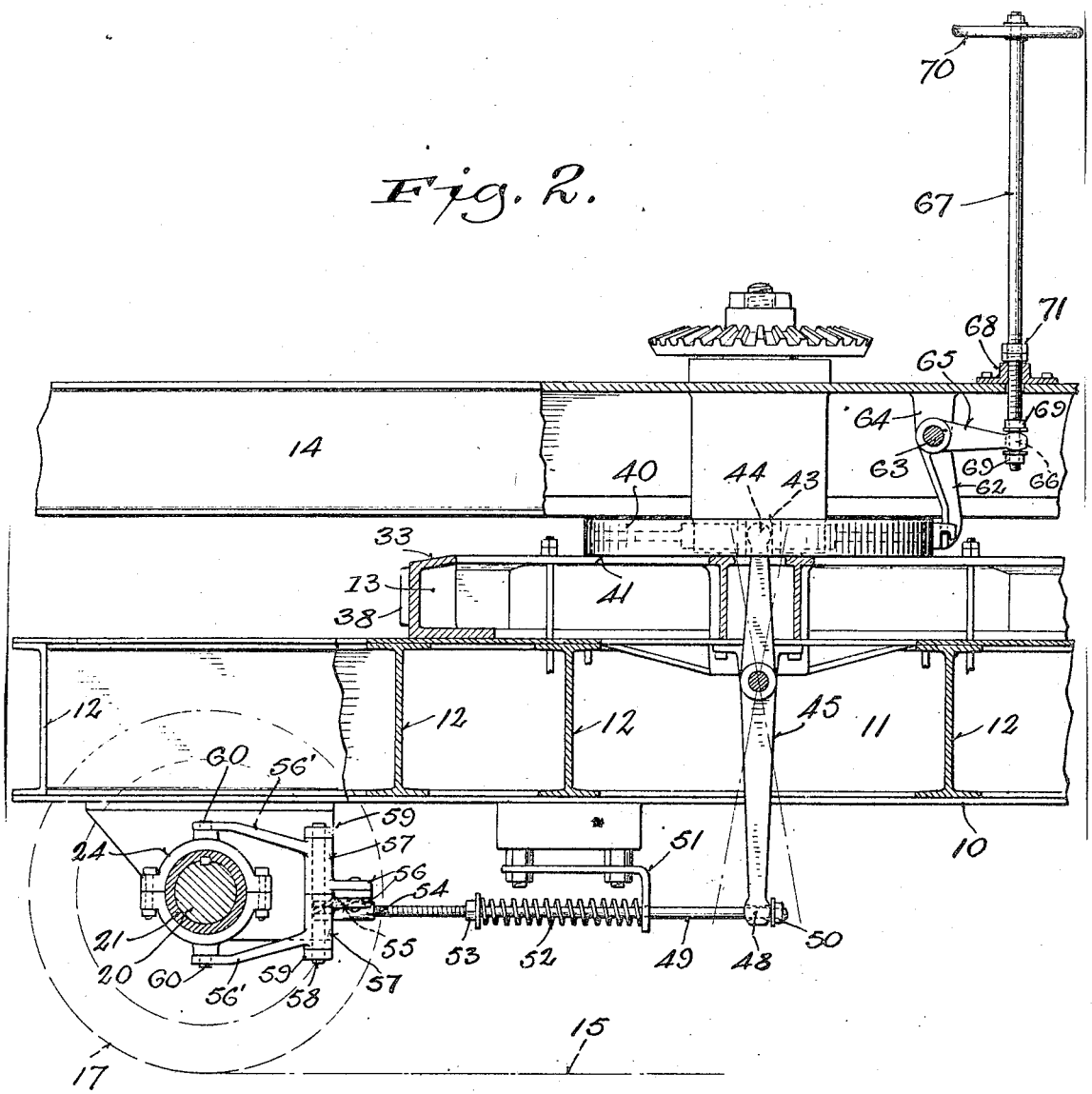
Figure 2 is a sectional view taken substantially along the line 2—2 of Figure 1.
Figure 3:
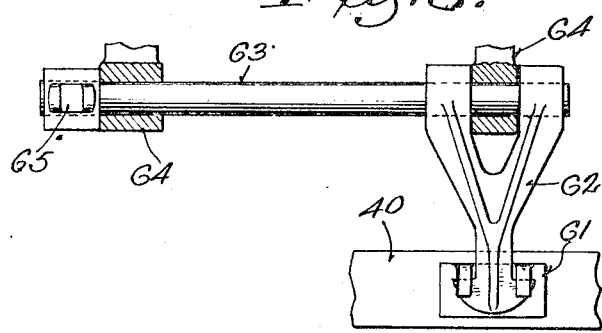
Figure 3 is a detail.

To effect steering of the machine during its travel from one point to another, the clamp shoe 61 is forced into frictional engagement with the periphery of the ring 40. Since the periphery of the ring is continuous and is arranged concentrically of the axis of rotation of the head frame, it is obvious that the engagement of the shoe 61 therewith may be readily effected in any of the various angular positions the head frame may assume relative to the base frame. To shift the shoe 61 into engagement with the ring, shaft 67 is rotated through nut 68 in such direction as to force the end of arm 65 downwardly and thus rock the shaft 63 and arm 62 in a clockwise direction (Figure 2). With the shoe 61 in ring engaging position, any rotation of the head frame 14 with respect to the base frame 10 will cause a corresponding rotation of ring 40. Excessive rotation of the ring 40 is avoided by the fact that the frictional engagement of the shoe 61 with the ring will permit slippage therebetween when the ring 40 has reached a limiting position. This frictional engagement of the shoe 61 with the ring 40, so as to permit slippage therebetween when the ring 40 has reached a limiting position, will for this reason be referred to in the claims as a slip connection.

The clutch elements 21 on the shaft 20 are each yieldably retained in interlocking engagement with their driving tumblers 17 under the influence of the spring 52, through the links 49, arms 55 and 56′, and clutch collars 24, so that power from the shaft 30 is applied to both traction units to drive the machine either forwardly or rearwardly in a straight line direction. To effect a turning movement in either direction, the head frame 14 is rotated through a small angle. This causes a corresponding rotation of the ring 40 with the result that the two levers 45 are rocked in opposite directions about the stub shafts 46. Assuming that the machine is traveling in a forward direction, and it is desired to turn to the right, the head frame is rotated slightly toward the right, that is, in a clockwise direction (Fig. 1). This causes the lever 45 on the right side of the machine to rock in a counter-clockwise direction (Fig. 2), to shift the corresponding link 49 to the right against the pressure of its spring 52. This causes the clutch element 21 on the right side of the machine to be disengaged from its driving tumbler 17, with the result that no power is applied to the traction unit on the right side of the machine. Rocking of the other lever 45 in the direction referred to does not affect the position of its link 49, with the result that the left hand clutch element remains in closed position and all the driving force is applied to the traction unit on the left side of the machine. This obviously causes the machine to turn toward the right. To effect turning in the other direction, the head frame 14 is rotated slightly in the other direction, both levers 45 are rocked in other directions and the clutch element on the left side of the machine is opened by the action of its lever 45, while the other clutch element is permitted to close under the pressure of its spring 52.

Various changes may be made in the embodiment of the invention hereinabove described, without departing from or sacrificing any of the advantages of the invention as defined in the appended claims.

I claim:

1. In a machine having a base frame and a head frame rotatably mounted thereon, the combination of a creeping traction support for said base frame, means including a clutch mechanism through which power may be applied to said creeping traction support to cause said machine to travel in a straight line direction, actuating mechanism for said clutch mechanism, and a slip connection between said head frame and said actuating mechanism to effect a turning movement of said machine by rotation of said head frame; said slip connection being such as to yield to excessive rotation of the head frame.

2. A machine of the character described having a base frame, a pair of creeping traction units supporting said frame, a head frame rotatably mounted on said base frame, a drive shaft, a clutch between said drive shaft and each of said traction units for driving said units, actuating mechanism for said clutches, and a slip connection between said head frame and said actuating mechanism for placing said clutches under the influence of said head frame to effect the selective release of either of said clutches by rotation of said frame; said slip connection being such as to yield to excessive rotation of the head frame.

3. In a machine having a base frame and a head frame rotatably mounted thereon, the combination of means including a pair of endless tread belts for supporting said base frame, a drive shaft, means for transmitting power from said shaft to either or both of said tread belts, means associated with said last named means for controlling the transmission of power to said tread belts, and means connected with said head frame for effecting a yieldable connection between said head frame and said control means by which said control means may be actuated by rotation of said frame; said yieldable connection being such as to yield to excessive rotation of the head frame.

4. In a machine having a base frame and a head frame, rotatably mounted thereon, the combination of means including a pair of endless tread belts for supporting said base frame, a drive shaft, means for transmitting power from said shaft to either or both of said tread belts, control mechanism for said transmission means including a ring arranged concentrically of the axis of rotation of said head frame, and means including a manually controlled clamp for frictional engagement with said ring by which said ring may be rotated by rotation of said head frame; said frictional engagement being such as to yield to excessive rotation of the head frame.

5. In a machine having a base frame and a head frame rotatably mounted thereon, the combination of creeping traction mechanisms supporting said base frame, driving means therefor, means for controlling the transmission of power from said driving means to said mechanisms to steer the machine, and means for releasably effecting an operative slip connection between said head frame and said controlling means in any angular position of said head frame relative to said base frame by which said controlling means may be made to respond to rotation of said head frame; said slip connection being such as to yield to excessive rotation of the head frame.

In witness whereof, I hereunto subscribe my name this 22nd day of May, 1922.

MITCHELL L. FYKSE.